US009624905B2

(12) United States Patent
Perley et al.

(10) Patent No.: US 9,624,905 B2
(45) Date of Patent: Apr. 18, 2017

(54) SYSTEM AND METHOD FOR PREVENTING EXCESSIVE LOADING ON A WIND TURBINE

(71) Applicant: General Electric Company, Schenectady, NY (US)

(72) Inventors: Thomas Franklin Perley, Simpsonville, SC (US); Brandon Shane Gerber, Charleston, SC (US); Jignesh Govindlal Gandhi, Simpsonville, SC (US); Venkata Krishna Vadlamudi, Bangalore (IN)

(73) Assignee: General Electric Company, Schenectady, NY (US)

(*) Notice: Subject to any disclaimer, the term of this patent is extended or adjusted under 35 U.S.C. 154(b) by 767 days.

(21) Appl. No.: 14/032,279

(22) Filed: Sep. 20, 2013

(65) Prior Publication Data
US 2015/0086356 A1  Mar. 26, 2015

(51) Int. Cl.
G05D 3/12 (2006.01)
F03D 7/02 (2006.01)
F03D 7/04 (2006.01)

(52) U.S. Cl.
CPC ........... *F03D 7/0292* (2013.01); *F03D 7/043* (2013.01); *F05B 2260/821* (2013.01);
(Continued)

(58) Field of Classification Search
CPC .................................................. F03D 7/0292
(Continued)

(56) References Cited

U.S. PATENT DOCUMENTS 5,652,485 A  7/1997 Spiegel et al.
7,175,389 B2  2/2007 Moroz
(Continued)

FOREIGN PATENT DOCUMENTS

EP  2444659 A1  4/2012
WO  2005010358 A1  2/2005
(Continued)

OTHER PUBLICATIONS

Pao, Lucy Y., and Kathryn E. Johnson. "Control of wind turbines." IEEE Control Systems 31.2 (2011): pp. 44-62.*
(Continued)

*Primary Examiner* — Satish Rampuria
(74) *Attorney, Agent, or Firm* — Dority & Manning, P.A.

(57) ABSTRACT

Systems and methods for preventing excessive loading on a wind turbine are disclosed. The method includes determining a current wind turbine parameter using at least one operating condition via a processor, the operating condition indicative of wind turbine operation; storing the current wind turbine parameter in a memory store over a predetermined time period; calculating a standard deviation of a plurality of the stored current wind turbine parameters; determining a future wind turbine parameter; calculating a maximum wind turbine parameter as a function of the standard deviation of the plurality of stored wind turbine parameters and the future wind turbine parameter; and, controlling the wind turbine based on a difference between the maximum wind turbine parameter and a parameter setpoint to prevent excessive loading from acting on the wind turbine.

15 Claims, 8 Drawing Sheets

(52) U.S. Cl.
CPC ..... *F05B 2270/32* (2013.01); *F05B 2270/332* (2013.01); *Y02E 10/723* (2013.01)

(58) Field of Classification Search
USPC ................................................. 700/286–306
See application file for complete search history.

(56) References Cited

U.S. PATENT DOCUMENTS

| | | | |
|---|---|---|---|
| 7,281,891 | B2 | 10/2007 | Smith et al. |
| 7,342,323 | B2 | 3/2008 | Avagliano et al. |
| 7,346,462 | B2 | 3/2008 | Delmerico |
| 7,351,033 | B2 | 4/2008 | McNerney |
| 7,476,485 | B2 | 1/2009 | Hatakeyama et al. |
| 7,476,985 | B2 | 1/2009 | Llorente Gonzalez |
| 7,505,833 | B2 | 3/2009 | Delmerico et al. |
| 7,573,149 | B2 | 8/2009 | Kammer et al. |
| 7,613,548 | B2 | 11/2009 | Cardinal et al. |
| 7,822,560 | B2 | 10/2010 | LeMieux |
| 7,861,583 | B2 | 1/2011 | Honhoff et al. |
| 7,870,783 | B2 | 1/2011 | Yoshida et al. |
| 7,883,317 | B2 | 2/2011 | Ormel et al. |
| 7,942,629 | B2 | 5/2011 | Shi et al. |
| 7,950,901 | B2 | 5/2011 | Barbu et al. |
| 7,964,979 | B2 | 6/2011 | Miranda et al. |
| 7,979,167 | B2 | 7/2011 | Delmerico et al. |
| 8,025,476 | B2 | 9/2011 | Zheng et al. |
| 8,035,241 | B2 | 10/2011 | Subramanian et al. |
| 8,050,887 | B2 | 11/2011 | Ahmann |
| 8,050,899 | B2 | 11/2011 | Giguere et al. |
| 8,093,737 | B2 | 1/2012 | Wittekind et al. |
| 8,128,362 | B2 | 3/2012 | Andersen et al. |
| 8,212,373 | B2 * | 7/2012 | Wittekind ............. F03D 7/0276 290/44 |
| 8,257,040 | B2 | 9/2012 | Chen et al. |
| 8,328,514 | B2 | 12/2012 | Viripullan et al. |
| 2003/0127862 | A1 * | 7/2003 | Weitkamp ............. F03D 7/0276 290/44 |
| 2006/0273595 | A1 | 12/2006 | Avagliano et al. |
| 2007/0057517 | A1 * | 3/2007 | McNerney ............. F03D 7/0224 290/44 |
| 2008/0195255 | A1 | 8/2008 | Lutze et al. |
| 2008/0211230 | A1 * | 9/2008 | Gurin ................. B60L 11/1861 290/2 |
| 2009/0099702 | A1 | 4/2009 | Vyas et al. |
| 2009/0261588 | A1 * | 10/2009 | Von Mutius ........ F03D 7/0224 290/44 |
| 2010/0237617 | A1 | 9/2010 | Vyas et al. |
| 2010/0241280 | A1 | 9/2010 | Garcia Barace et al. |
| 2010/0283245 | A1 | 11/2010 | Gjerlov et al. |
| 2010/0312594 | A1 | 12/2010 | Andersen et al. |
| 2011/0153096 | A1 | 6/2011 | Pal et al. |
| 2012/0078517 | A1 | 3/2012 | Bogucki |
| 2012/0086209 | A1 | 4/2012 | Obrecht |
| 2012/0133138 | A1 | 5/2012 | Soerensen et al. |
| 2012/0165996 | A1 | 6/2012 | Olesen |
| 2013/0033040 | A1 | 2/2013 | Bowyer et al. |
| 2013/0035798 | A1 | 2/2013 | Zhou et al. |
| 2013/0156577 | A1 | 6/2013 | Esbensen et al. |
| 2013/0161955 | A1 | 6/2013 | Dalsgaard et al. |
| 2013/0297085 | A1 | 11/2013 | Xiongzhe et al. |

FOREIGN PATENT DOCUMENTS

| | | | | |
|---|---|---|---|---|
| WO | WO 2009153614 | A2 * | 12/2009 | ........... F03D 7/0224 |
| WO | 2010069534 | A1 | 6/2010 | |
| WO | 2011042369 | A2 | 4/2011 | |
| WO | 2011076818 | A2 | 6/2011 | |
| WO | 2011076875 | A2 | 6/2011 | |
| WO | 2011101475 | A2 | 8/2011 | |
| WO | 2011160634 | A1 | 12/2011 | |
| WO | WO 2011/157271 | A2 | 12/2011 | |
| WO | 2012044161 | A1 | 4/2012 | |
| WO | 2012136277 | A1 | 10/2012 | |
| WO | 2012149984 | A1 | 11/2012 | |
| WO | 2013000468 | A1 | 1/2013 | |

OTHER PUBLICATIONS

Xiang, Dawei, et al. "Control of a doubly fed induction generator in a wind turbine during grid fault ride-through." IEEE Transactions on Energy Conversion 21.3 (2006): pp. 652-662.*

European Search Report from corresponding EP Application No. 14183661.9 dated Feb. 23, 2015.

European Search Report and Opinion issued in connection with corresponding EP Application No. 14183661.9 on Jul. 16, 2015.

* cited by examiner

SYSTEM AND METHOD FOR PREVENTING EXCESSIVE LOADING ON A WIND TURBINE

FIELD OF THE INVENTION

The present invention relates generally to wind turbines, and more particularly, to systems and methods for preventing excessive loading on a wind turbine.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and a rotor. The rotor typically includes a rotatable hub having one or more rotor blades attached thereto. A pitch bearing is typically configured operably between the hub and a blade root of the rotor blade to allow for rotation about a pitch axis. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The amount of power that may be produced by a wind turbine is typically limited by structural limitations (i.e. design loads) of the individual wind turbine components. For example, the blade root of a wind turbine may experience loads (e.g. a blade root bending moment) associated with both average loading due to turbine operation and dynamically fluctuating loads due to environmental conditions. Such loading may damage the pitch bearing, thereby eventually causing the pitch bearing to fail. The fluctuating loads can change day-to-day or season-to-season and may be based on wind speed, wind peaks, wind turbulence, wind shear, changes in wind direction, density in the air, yaw misalignment, upflow, or similar. Specifically, for example, loads experienced by a wind turbine may vary with wind speed.

As such, it is imperative to monitor loads acting on the wind turbine to ensure design loads are not exceeded. Various systems and methods have been employed to estimate loads experienced by a wind turbine. For example, one system estimates loads by determining a thrust acting on the wind turbine. The terms "thrust," "thrust value," "thrust parameter" or similar as used herein are meant to encompass a force acting on the wind turbine due to the wind. The thrust force comes from a change in pressure as the wind passes the wind turbine and slows down. For example, FIGS. 1 and 2 illustrate a loading and a thrust acting on a wind turbine component as a function of wind speed, respectively. The solid lines represent an average load and an average thrust for three different turbulence intensity levels, whereas the dotted lines represent a maximum load and a maximum thrust, respectively. More specifically, solid lines 100, 200 and dotted lines 102, 202 represent a rough wind day with approximately 25% turbulence intensity; solid lines 104, 204 and dotted lines 106, 206 represent an intermediate wind day with approximately 15% turbulence intensity; and solid lines 108, 208 and dotted lines 110, 210 represent a relatively smooth wind day with approximately 5% turbulence intensity.

As shown in FIG. 1, the average load is almost the same for all three turbulence intensity levels; however, the maximum load dramatically increases with increased turbulence intensity and wind speed. Similarly, as shown in FIG. 2, the corresponding thrust also dramatically increases with increased turbulence intensity and wind speed. In other words, there is a direct correlation between wind turbine loading and thrust, as shown in FIG. 3. Accordingly, estimating the thrust experienced by the wind turbine may assist in predicting, and therefore minimizing, loads acting on various wind turbine components.

Further control strategies have utilized various control technologies that utilize algorithms to estimate loads acting on a wind turbine. For example, referring now to FIG. 4, a wind turbine implementing one such control technology estimates loads acting on the wind turbine by determining an estimated thrust (line 402). The technology calculates the estimated thrust 402 using a plurality of turbine operating conditions, such as, for example, pitch angle, power output, generator speed, and air density. The operating conditions are inputs for the algorithm, which includes a series of equations, one or more aerodynamic performance maps, and one or more look-up tables (LUTs). In the illustrated embodiment, for example, the LUT is representative of a wind turbine thrust. A +/− standard deviation of the estimated thrust (lines 404, 406) may also be calculated, along with an operational maximum thrust (point 408) and a thrust limit 410. As such, the wind turbine may be controlled based on a difference between the maximum thrust 408 and the thrust limit 410. Such control technologies, however, are typically only representative of ideal operating conditions (i.e. steady state conditions) and do not represent dynamic or fluctuating loads due to environmental conditions. Additionally, the thrust limit 410 remains constant even though loads experienced by the wind turbine may vary with wind speed.

Accordingly, an improved system and method for preventing excessive loads on a wind turbine that varies the thrust limit would be welcomed in the technology. More specifically, a system and method that incorporated dynamically fluctuating loads due to environmental conditions would be advantageous.

BRIEF DESCRIPTION OF THE INVENTION

Aspects and advantages of the invention will be set forth in part in the following description, or may be obvious from the description, or may be learned through practice of the invention.

In one aspect, a method for preventing excessive loading on a wind turbine is disclosed. The method includes determining a current wind turbine parameter using at least one operating condition via a processor, the operating condition indicative of wind turbine operation; storing the current wind turbine parameter in a memory store over a predetermined time period; calculating a standard deviation of a plurality of the stored current wind turbine parameters; determining a future wind turbine parameter; calculating a maximum wind turbine parameter as a function of the standard deviation of the plurality of stored wind turbine parameters and the future wind turbine parameter; and, controlling the wind turbine based on a difference between the maximum wind turbine parameter and a parameter setpoint to prevent excessive loading on the wind turbine.

In additional embodiments, the at least one operating condition may include any of the following: a pitch angle, a generator speed, a power output, a torque output, a temperature, a pressure, a tip speed ratio, an air density, a rotor speed, or similar. In yet another embodiment, the current wind turbine parameter and the future wind turbine parameter are reflective of a wind turbine thrust.

In a further embodiment, the step of determining the current wind turbine parameter and determining the future wind turbine parameter includes utilizing a plurality of equations, one or more aerodynamic performance maps, and/or one or more look-up tables. In additional embodiments, the method further includes the step of determining a plurality of current wind turbine parameters and filtering the plurality of current wind turbine parameters. In various embodiments, the step of filtering the plurality of current wind turbine parameters may include utilizing at least one of a high pass filter, a low pass filter, or combination thereof. In further embodiments, the method further includes applying one of a constant or variable gain to the standard deviation.

In a further embodiment, the step of calculating a maximum wind turbine parameter as a function of the standard deviation and the future wind turbine parameter includes adding the standard deviation and the future wind turbine parameter. Additionally, the step of calculating may include multiplying the standard deviation by a scaler factor. In another embodiment, the method further includes varying the parameter setpoint based on at least one of a wind parameter or one of the operation conditions. In yet another embodiment, the step of controlling the wind turbine based on the difference between the maximum thrust parameter and a parameter setpoint to prevent excessive loading on the wind turbine includes implementing a control action. The control action may include any of the following: altering a pitch angle of a rotor blade, modifying a generator torque, modifying a generator speed, modifying a power output, yawing a nacelle of the wind turbine, braking one or more wind turbine components, activating an airflow modifying element on a rotor blade, or similar.

In another aspect, a method for preventing excessive loading on a wind turbine is disclosed. The method includes estimating a current wind parameter using at least one operating condition via a processor, the operating condition indicative of wind turbine operation; determining a loading condition based on the current wind parameter, the loading condition representative of a load acting on the wind turbine; determining a parameter setpoint based on the current wind parameter, the parameter setpoint reflective of a loading of the wind turbine before excessive loading occurs; varying the parameter setpoint with the current wind turbine parameter; and controlling the wind turbine based on a difference between the loading condition and the parameter setpoint to prevent excessive loading on the wind turbine. It should be understood that the method may further include any of the steps described herein.

In another embodiment, the current wind parameter may be representative of a wind speed. As such, the method may further include varying the parameter setpoint based on the wind speed. In another embodiment, the loading condition may be representative of a wind turbine thrust.

In yet another aspect, a method for preventing excessive loading on a wind turbine is disclosed. The method includes determining a current thrust parameter based on a plurality of operating conditions, the operating conditions indicative of wind turbine operation; storing the current thrust parameter in a memory store over a predetermined time period; calculating a standard deviation of a plurality of the stored current thrust parameters; applying one of a constant gain or variable gain to the standard deviation; determining a future thrust parameter; calculating a maximum thrust parameter as a function of the standard deviation and the future wind turbine parameter; and, implementing a control action based on a difference between the maximum thrust parameter and a parameter setpoint to prevent excessive loading on the wind turbine. It should be understood that the method may further include any of the steps described herein.

In still another aspect, a system for preventing excessing loading on a wind turbine is disclosed. The system may include a processor and a controller configured to complete any of the steps of the various methods described herein.

These and other features, aspects and advantages of the present invention will become better understood with reference the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
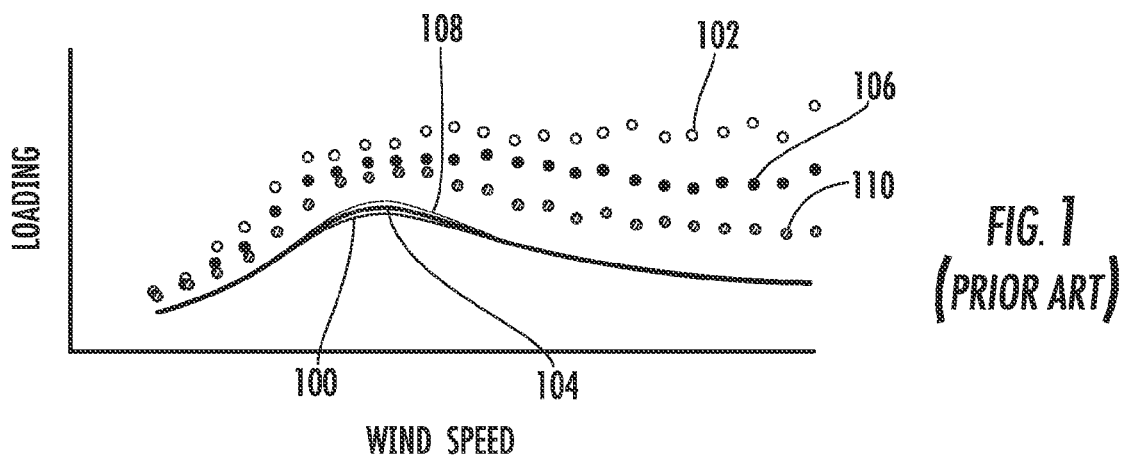
FIG. 1 illustrates a graph of a load acting on a wind turbine as a function of wind speed according to conventional control strategies.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a system and method for preventing excessive loading on a wind turbine by estimating steady-state and dynamically fluctuating loads experienced by the wind turbine. In one embodiment, for example, the present disclosure determines a current wind turbine parameter, such as a thrust parameter, using a plurality of operating conditions. The operating conditions may consist of any combination of the following: a pitch angle, a generator speed, a power output, a torque output, a temperature, a pressure, a tip speed ratio, an air density, a rotor speed, or similar. The system then stores a plurality of current wind turbine parameters and calculates a standard deviation of the stored parameters. The system can also simultaneously calculate a future wind turbine parameter. As such, a maximum wind turbine parameter can be determined as a function of the current and future wind turbine parameters. The maximum wind turbine parameter is indicative of a projected load expected to reach the wind turbine and represents both steady-state loads from turbine operation and dynamically fluctuating loads due to environmental conditions. Accordingly, the system may determine a difference between the maximum wind turbine parameter and a parameter setpoint and control the wind turbine based on the difference to prevent excessive loading on the wind turbine. In addition, the parameter setpoint may be varied based on a wind parameter, such as wind speed, or one of the operation conditions.

In another embodiment, the method includes estimating a wind speed using a plurality of operating condition via a processor, using the estimated wind speed to set a thrust limit, and estimating a thrust value of the wind turbine based on the wind speed. As such, a controller can control the wind turbine based on a difference between the thrust value and the thrust limit to prevent excessive loading on the wind turbine. Additionally, the method may further include varying the thrust limit based on a wind parameter, such as wind speed, or one of the operation conditions.

The various embodiments of the system and method described herein provides numerous advantages. For example, by utilizing both average loading from turbine operation and fluctuating or dynamic loading from environmental conditions, the present disclosure as described herein can more effectively estimate wind turbine loads and can therefore more efficiently prevent excessive loading that may damage the wind turbine. Further, by varying the thrust limit based on a wind parameter or one or more of the operation conditions, the present disclosure can more effectively mitigate loads acting on various wind turbine components. Accordingly, fatigue and extreme failure of various wind turbine components may be minimized, while also maximizing annual energy production (AEP). Moreover, the present disclosure may be implemented using existing components of the wind turbine. As such, a user is not required to purchase, install, and maintain new equipment. Moreover, the system may be integrated with a broader control system, such as, but not limiting of, a wind turbine control system, a plant control system, a remote monitoring system, or combinations thereof.

Figure 2:
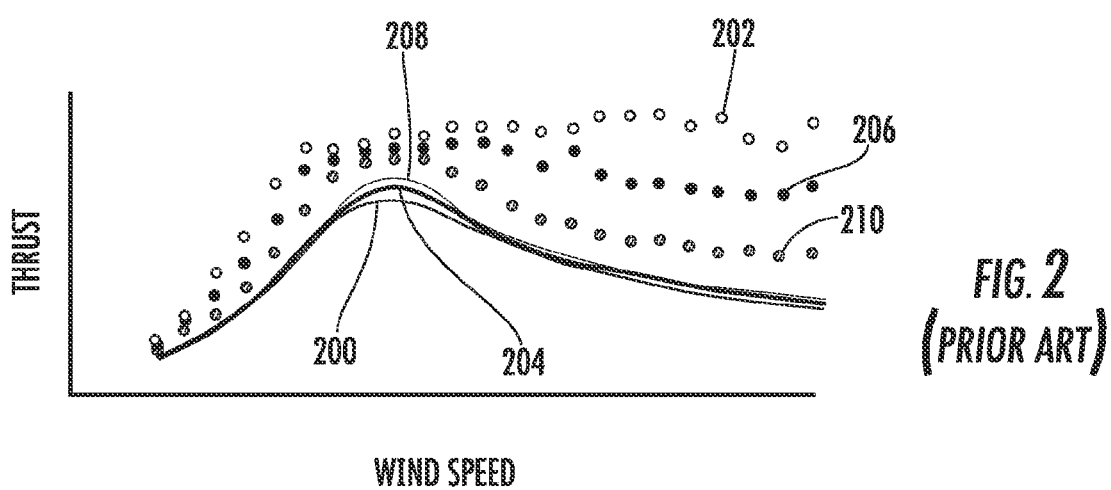
FIG. 2 illustrates a graph of a thrust acting on a wind turbine as a function of wind speed according to conventional control strategies.
Figure 3:
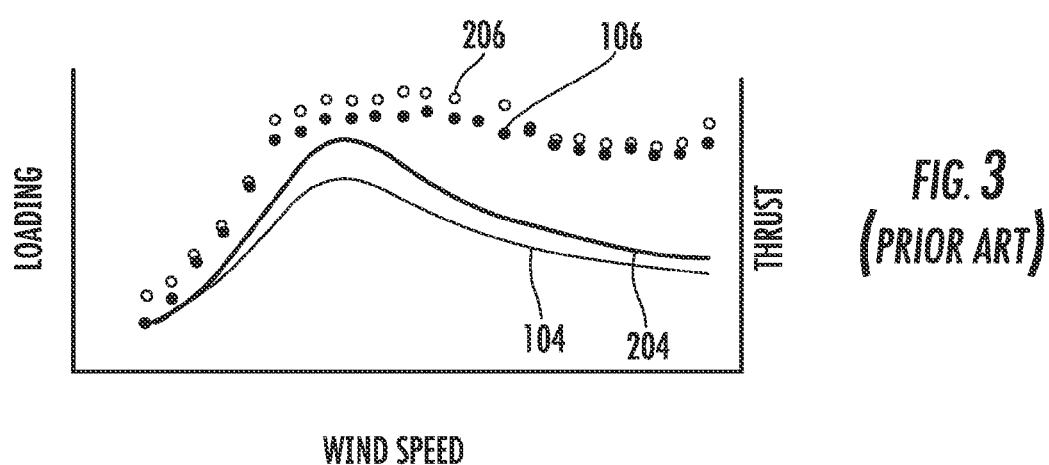
FIG. 3 illustrates a graph of a load and a thrust acting on a wind turbine as a function of wind speed according to conventional control strategies.
Figure 4:
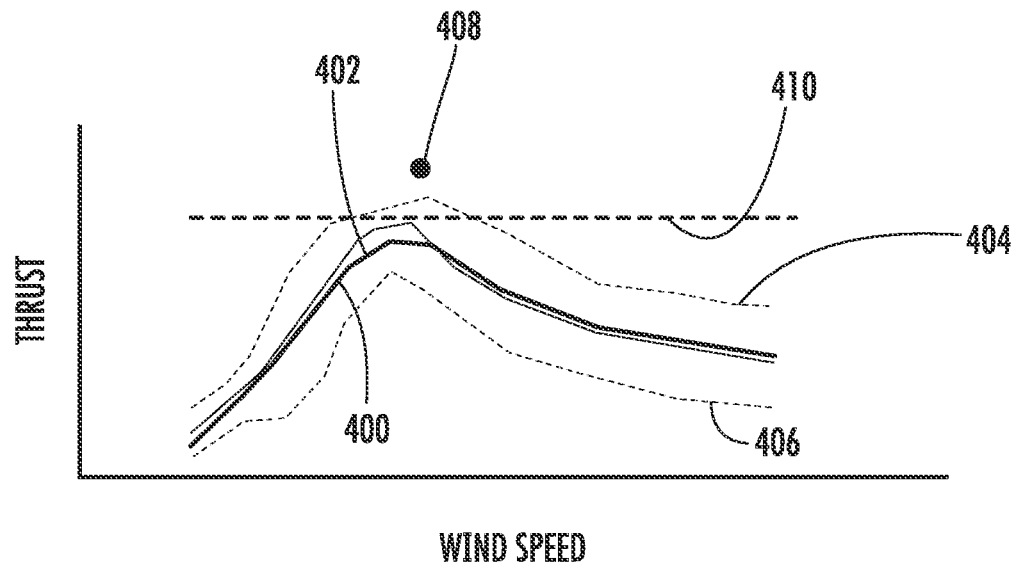
FIG. 4 illustrates a graph of a thrust acting on a wind turbine as a function of wind speed according to conventional control strategies.
Figure 5:
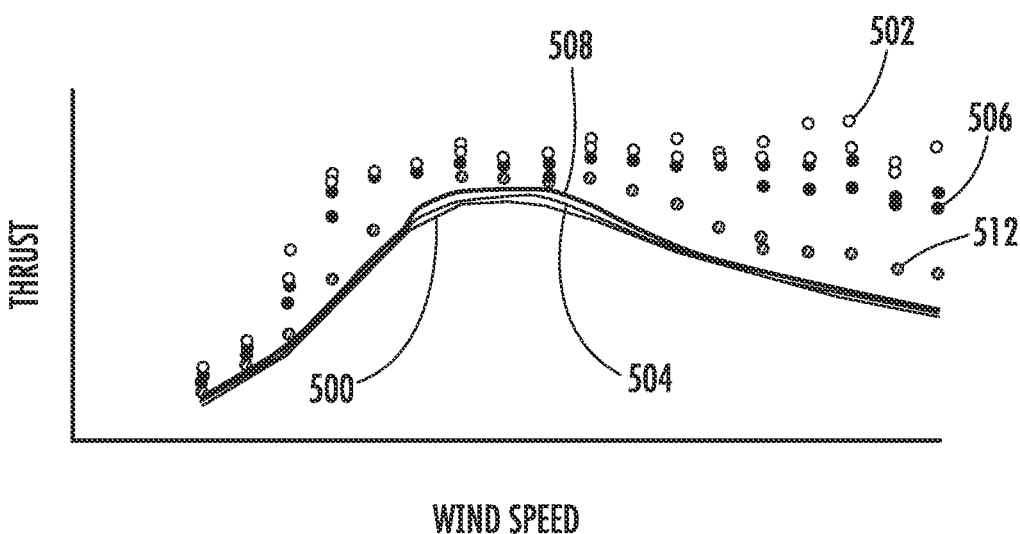
FIG. 5 illustrates a graph of a thrust acting on a wind turbine as a function of wind speed according to the present disclosure.

Further advantages of the present disclosure may be better understood with reference to FIGS. 2 and 5. For illustration purposes only, the current wind turbine parameter is a wind turbine thrust value, as indicated on the y-axis. As shown in FIG. 5, the solid lines 500, 504, 508 represent an average thrust value for three different turbulence intensity levels, whereas the dotted lines 502, 506, 512 represent a maximum thrust value. Solid line 500 and dotted line 502 represents a rough wind day with approximately 20% turbulence intensity; solid line 504 and dotted line 506 represents an intermediate wind day with approximately 15% turbulence intensity; and solid line 508 and dotted line 512 represent a relatively smooth wind day with approximately 5% turbulence intensity. Similar to FIG. 2, the average thrust value (lines 500, 504, 508) is almost the same for all three turbulence intensity levels. In contrast, however, the control technology of the present disclosure dramatically decreases the maximum thrust values, as illustrated by lines 502, 506, and 512, when compared to the conventional control technologies illustrated in FIG. 2, as illustrated by lines 202, 206, and 210. Accordingly, the present disclosure more effectively estimates loads acting on the wind turbine, thereby providing an improved method of preventing excessive loading from damaging the wind turbine.

Figure 6:
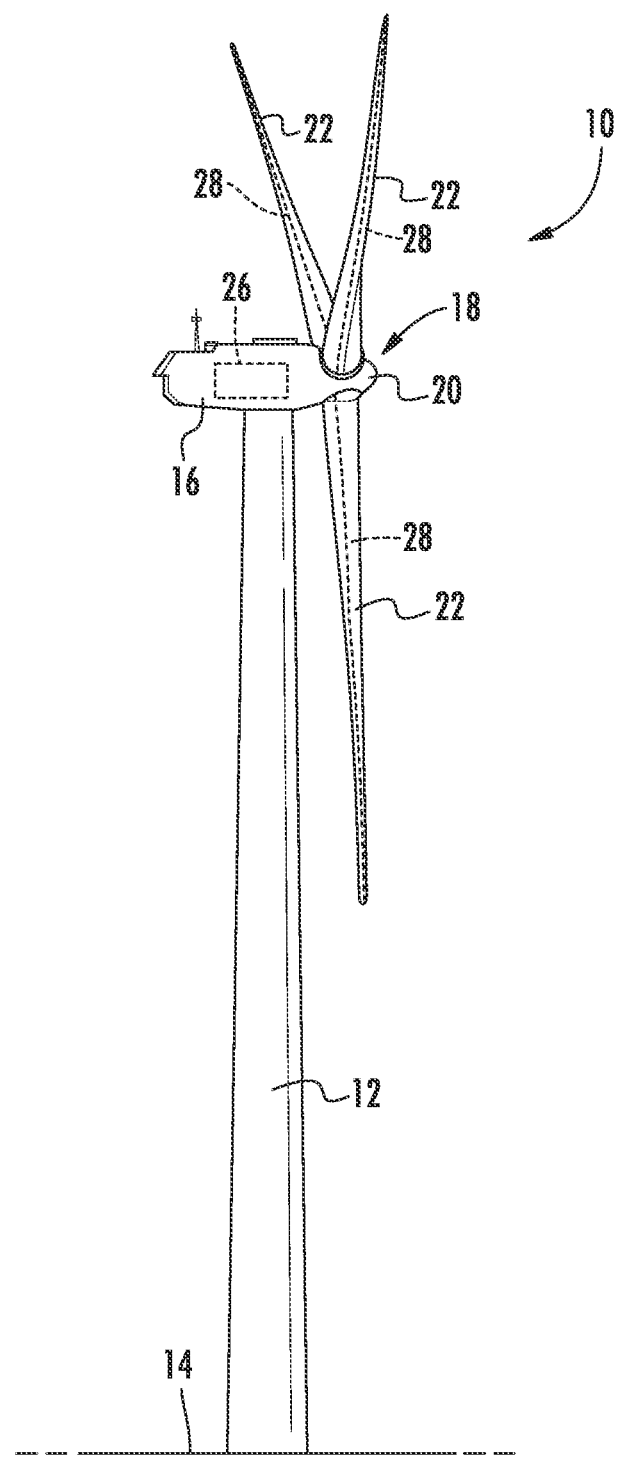
FIG. 6 illustrates a perspective view of one embodiment of a wind turbine according to the present disclosure.

Referring now to FIG. 6, a perspective view of one embodiment of a wind turbine 10 that may implement the control technology according to the present disclosure is illustrated. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 7) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine. Further, the controller 26 may be communicatively coupled to any number of the components of the wind turbine 10 in order to control the operation of such components and/or to implement a correction action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rate the wind turbine, and/or control various components of the wind turbine 10 as will be discussed in more detail below.

Figure 7:
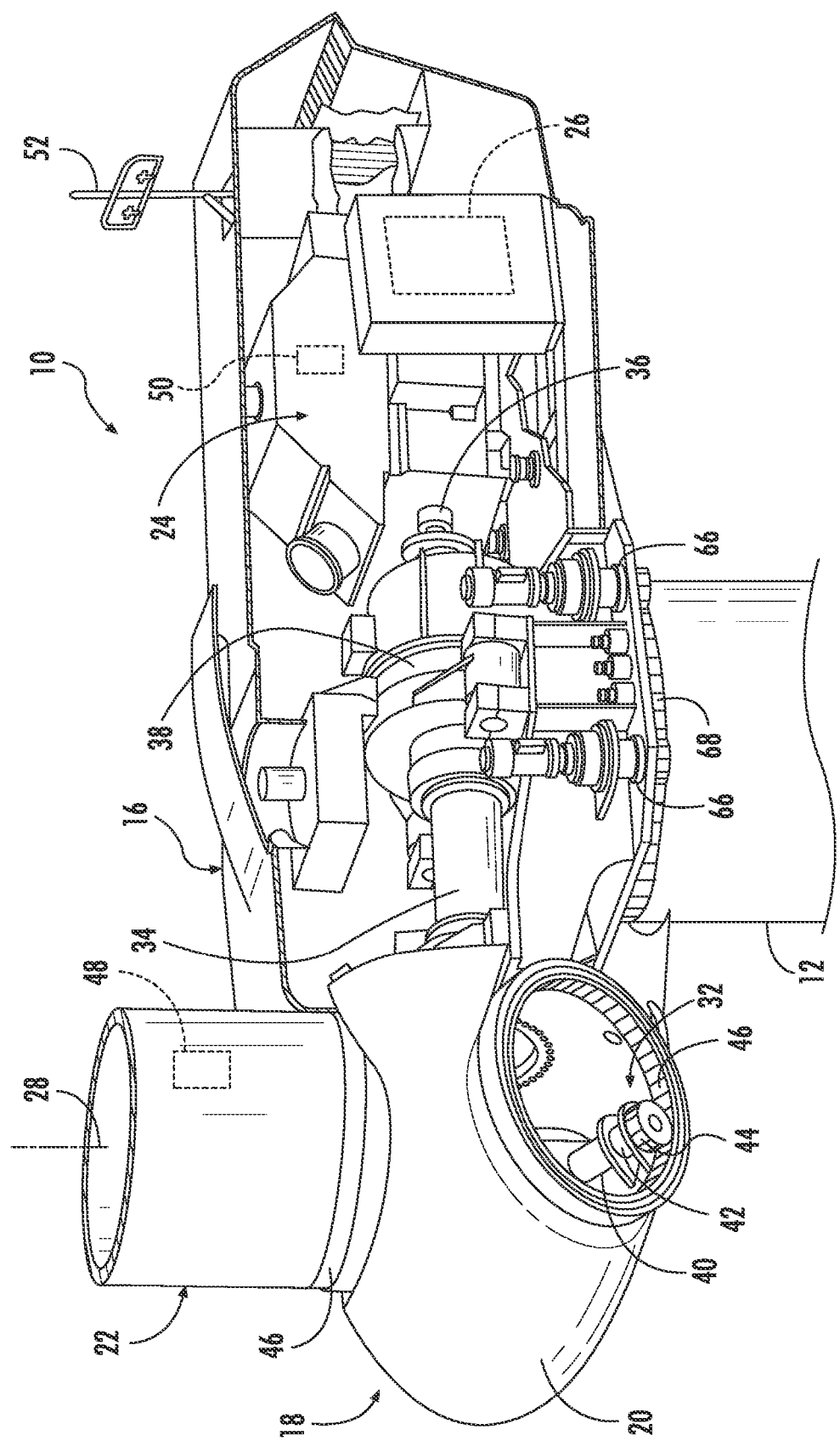
FIG. 7 illustrates a simplified, internal view of one embodiment of a nacelle of a wind turbine according to the present disclosure.

Referring now to FIG. 7, a simplified, internal view of one embodiment of the nacelle 16 of the wind turbine 10 shown in FIG. 6 is illustrated. As shown, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric, hydraulic, or pneumatic motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

Still referring to FIG. 7, the wind turbine 10 may also include one or more sensors 48, 50, 52 for measuring operating conditions needed to calculate the current wind turbine parameter. For example, in various embodiments, the sensors may include blade sensors 48 for measuring a pitch angle of one of the rotor blades 22 or for measuring a loading acting on one of the rotor blades 22; generator sensors 50 for monitoring the generator 24 (e.g. torque, rotational speed, acceleration and/or the power output); and/or various wind sensors 52 for measuring various wind parameters, such as wind speed, wind peaks, wind turbulence, wind shear, changes in wind direction, air density, or similar. Further, the sensors may be located near the ground of the wind turbine, on the nacelle, or on a meteorological mast of the wind turbine. It should also be understood that any other number or type of sensors may be employed and at any location. For example, the sensors may be Micro Inertial Measurement Units (MIMUs), strain gauges, accelerometers, pressure sensors, angle of attack sensors, vibration sensors, Light Detecting and Ranging (LIDAR) sensors, camera systems, fiber optic systems, anemometers, wind vanes, Sonic Detection and Ranging (SODAR) sensors, infra lasers, radiometers, pitot tubes, rawinsondes, other optical sensors, and/or any other suitable sensors. It should be appreciated that, as used herein, the term "monitor" and variations thereof indicates that the various sensors may be configured to provide a direct measurement of the parameters being monitored or an indirect measurement of such parameters. Thus, the sensors may, for example, be used to generate signals relating to the parameter being monitored, which can then be utilized by the controller 26 to determine the actual parameter.

Figure 8:
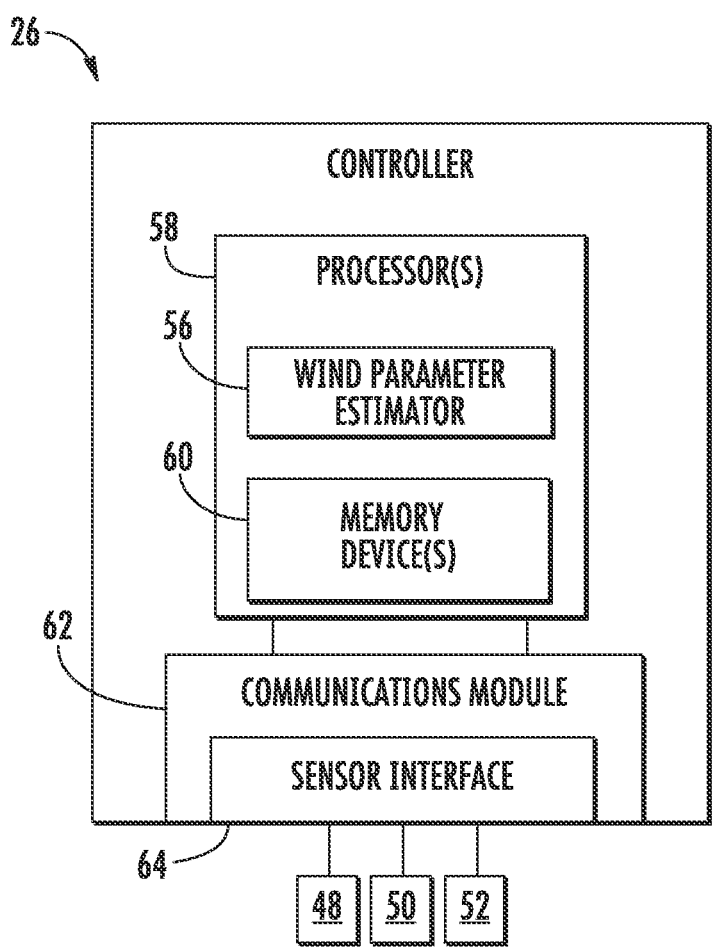
FIG. 8 illustrates a schematic diagram of one embodiment of a controller according to the present disclosure.
Figure 9:
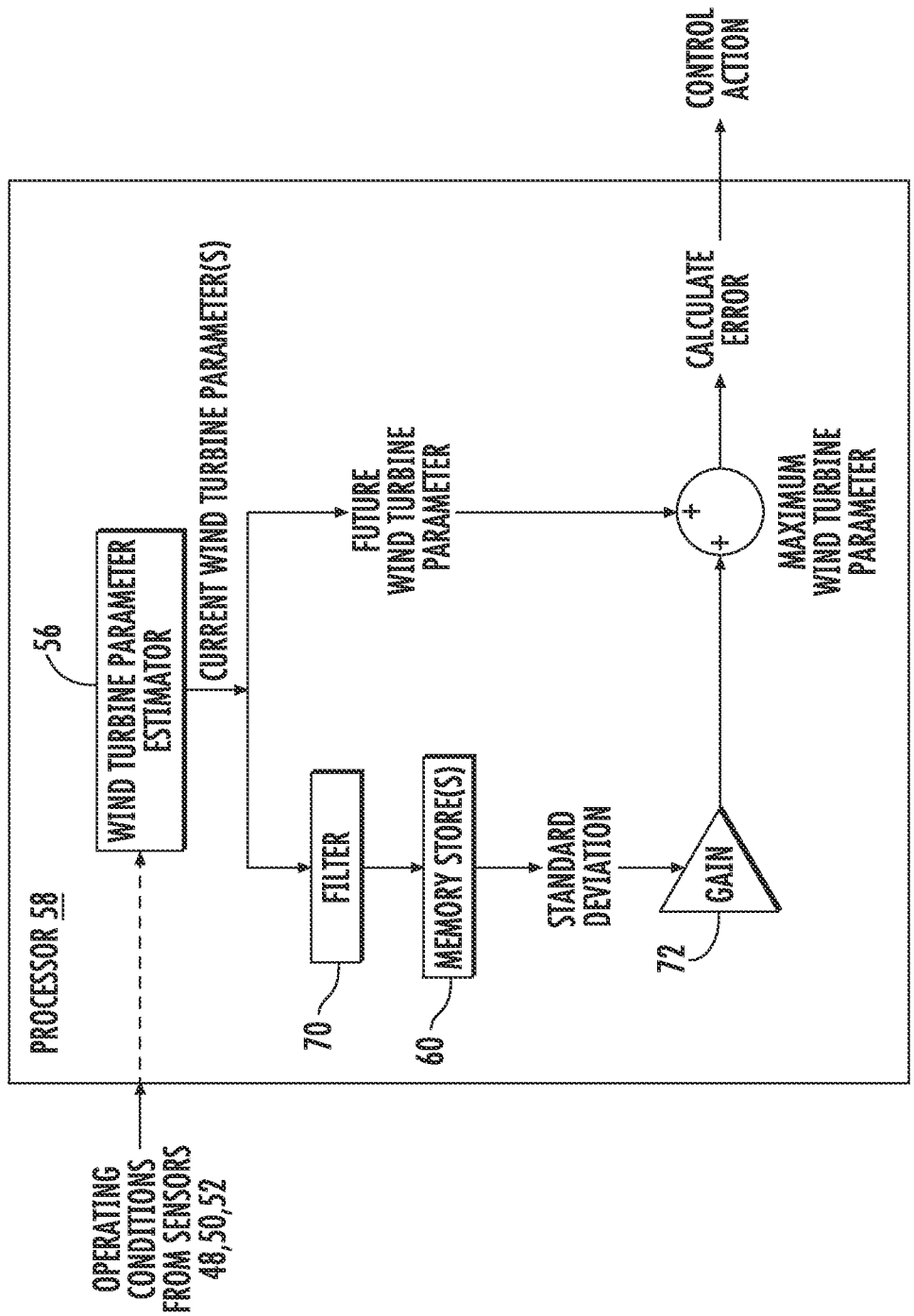
FIG. 9 illustrates a schematic diagram of one embodiment of a processor according to the present disclosure.

Referring now to FIGS. 8 and 9, there are illustrated block diagrams of various embodiments of the controller 26 and the processor 58 according to the present disclosure. As shown in FIG. 8, the controller 26 may include one or more processor(s) 58, a wind turbine parameter estimator 56, and associated memory device(s) 60 configured to perform a variety of computer-implemented functions (e.g., performing the methods, steps, calculations and the like and storing relevant data as disclosed herein). Additionally, the controller 26 may also include a communications module 62 to facilitate communications between the controller 26 and the various components of the wind turbine 10. Further, the communications module 62 may include a sensor interface 64 (e.g., one or more analog-to-digital converters) to permit signals transmitted from the sensors 48, 50, 52 to be converted into signals that can be understood and processed by the processors 58. It should be appreciated that the sensors 48, 50, 52 may be communicatively coupled to the communications module 62 using any suitable means. For example, as shown in FIG. 8, the sensors 48, 50, 52 are coupled to the sensor interface 64 via a wired connection. However, in other embodiments, the sensors 48, 50, 52 may be coupled to the sensor interface 64 via a wireless connection, such as by using any suitable wireless communications protocol known in the art.

Referring now to FIG. 9, a block diagram to further illustrate the processor 58 according to the present disclosure is illustrated. As shown, the processor 58 receives one or more signals from the sensors 48, 50, 52. More specifically, the wind turbine parameter estimator 56 receives the signals from the sensors 48, 50, 52 that are representative of wind turbine operation. Further, the wind turbine parameter estimator 56 is configured to determine a current wind turbine parameter or a current wind parameter as described herein. As used herein, a current wind turbine parameter is typically reflective of a loading acting on the wind turbine, such as a thrust, whereas the term current wind parameter is typically reflective of a wind condition, such as a wind speed, wind peaks, wind turbulence, wind shear, changes in wind direction, density in the air, and/or similar. It should be understood that the wind parameter estimator 56 is configured to determine both current and future wind turbine parameters and current and future wind parameters. The wind turbine parameter estimator 56 may be considered software that utilizes a plurality of operating conditions to calculate, in real-time, the current wind turbine parameter. Further, the wind turbine parameter estimator 56 may comprise firmware that includes the software, which may be executed by the processor 58. Further, the wind parameter estimator 56 may be in communication the various sensors and devices of the wind turbine 10, which may provide the operating conditions to the wind turbine estimator 56.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 26 to perform various functions including, but not limited to, determining one or more current wind turbine parameters of the wind turbine 10 based on the plurality of operating data, determining a maximum wind turbine parameter, transmitting suitable control signals to implement control actions to reduce loads acting on the wind turbine, and various other suitable computer-implemented functions.

Still referring to FIG. 9, the wind turbine parameter estimator 56 may calculate the current wind turbine/wind parameter as a function of one or more operating conditions. The current wind turbine parameter is at least representative of a steady-state loading experienced by the wind turbine during turbine operation. The operating conditions may consist of any combination of the following: a pitch angle, a generator speed, a power output, a torque output, a temperature, a pressure, a tip speed ratio, an air density, a rotor speed, or similar. Accordingly, the wind parameter estimator 56 is configured to implement a control algorithm having a series of equations to determine the estimated current wind turbine parameter. As such, the equations are solved using the one or more operating conditions, one or more aerodynamic performance maps, one or more LUTs, or any combination thereof. In one embodiment, the aerodynamic performance maps are dimensional or non-dimensional tables that describe rotor loading and performance (e.g. power, thrust, torque, or bending moment, or similar) under given conditions (e.g. density, wind speed, rotor speed, pitch angles, or similar). As such, the aerodynamic performance maps may include: a power coefficient, a thrust coefficient, a torque coefficient, and/or partial derivatives with respect to pitch angle, rotor speed, or tip speed ratio. Alternatively, the aerodynamic performance maps can be dimensional power, thrust, and/or torque values instead of coefficients. In various embodiments, the LUTs may include: blade bending load, tower bending load, shaft bending load, or any other turbine component load.

Still referring to FIG. 9, the wind turbine parameter estimator 56 may also calculate a plurality of current wind turbine/wind parameters and filter the plurality of current wind turbine/wind parameters using a filter 70. In one embodiment, the filter 70 may be a high-pass filter. As such, the low frequency signals may be filtered from the plurality of current wind turbine/wind parameters, thereby providing more reliable data. The high pass filter as described herein may be a filter that passes high-frequency signals but attenuates (i.e. reduces the amplitude of) signals with frequencies lower than a cutoff frequency. In further embodiments, the high-pass filter may be used in conjunction with a low-pass filter. Further, any number of high-pass filters or low-pass filters may be used in accordance with the present disclosure. For example, in an alternative embodiment, the filter 70 may be a low-pass filter. As such, the low-pass filter may pass low-frequency signals but attenuate signals with frequencies higher than a cutoff frequency. The low-frequency signals may be then subtracted from the raw signal such that only the high-frequency signals remain.

The processor 58 is also configured to store the plurality of the current wind turbine parameters over a predetermined time period, for example, in one or more memory device(s) 60. The predetermined time period may be any suitable amount of time, e.g. seconds, minutes, or hours. As such, the processor 58 can calculate a standard deviation of the stored current wind turbine parameters. In one embodiment, the standard deviation as described herein indicates the variation or dispersion that exists from an average (mean) or expected value. The processor 58 may also apply a constant or variable gain to the standard deviation using an amplifier 72. As such, the controller 26 is capable of being more or less sensitive to the transient (i.e. unsteady) component of the signal. Further, the control sensitivity can be customized to different regions of operation or areas of loading concern (e.g. more sensitive in high risk regions or less sensitive in low risk regions).

In addition, the processor 58, or more specifically the wind turbine parameter estimator 56, is configured to determine a future wind turbine parameter. The future wind turbine parameter is typically reflective of a wind turbine thrust and/or loading that is likely to occur at the wind turbine at a future time. The wind turbine parameter estimator 56 is also configured to calculate the future wind turbine parameter using a series of equations, one or more aerodynamic performance maps, one or more LUTs, or any combination thereof. In another embodiment, the wind turbine parameter estimator 56 may also calculate the future wind turbine parameter using the current wind turbine parameter.

The processor 58 can then determine a maximum wind turbine parameter as a function of the standard deviation of the stored current wind turbine parameters and the future wind turbine parameter. For example, in one embodiment, the standard deviation and the future wind turbine parameter are added together to determine the maximum wind turbine parameter. In a further embodiment, the standard deviation may first be multiplied by a scaler factor and then added to the future wind turbine parameter to obtain the maximum wind turbine parameter. The scaler factor may be any user-specified value, ranging from about 1 to about 20. Further, the scaler factor may be a fixed value or may be varied with respect to time and/or wind speed. As such, in one embodiment, the maximum wind turbine parameter may be a function of the future wind turbine parameter, the standard deviation of the stored current wind turbine parameters, and the scaler factor. Accordingly, the processor 58 can then calculate a difference between the maximum wind turbine parameter and a parameter setpoint, such as a thrust limit, and control the wind turbine 10 based on the difference.

Figure 10:
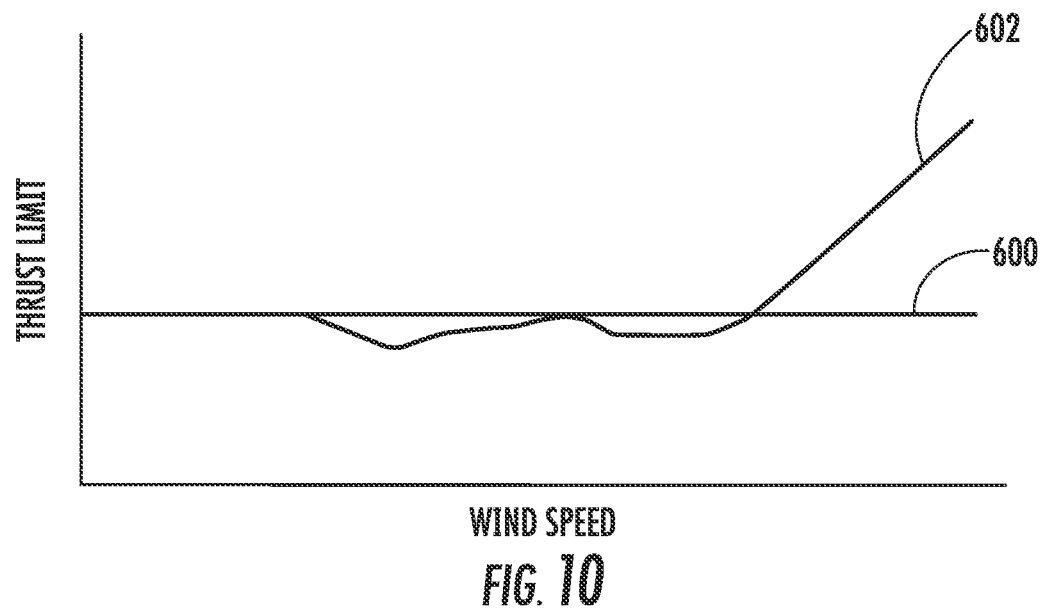
FIG. 10 illustrates a graph comparing a constant thrust limit and a variable thrust limit as a function of wind speed according to the present disclosure.

The parameter setpoint is typically a limit set by the controller 26 such that design loads of various wind turbine components are not exceeded. As such, the parameter setpoint or limit may be any value pre-programmed within the controller 26 and is typically a function of design loads for the wind turbine 10 and/or its various component(s). For example, as shown in FIG. 10, the parameter setpoint 600 may be a constant value such that the corresponding thrust value 700 (FIG. 11) remains below allowable design limits. In an alternative embodiment, as illustrated in FIG. 10, the parameter setpoint 602 may be varied with respect to a wind parameter (e.g. a wind speed) and/or other operating conditions. As such, in one embodiment, the parameter setpoint may be varied based on a function of one or more operating conditions representative of a real-time operational state of the wind turbine. More specifically, for example, the parameter setpoint may be varied using a function of a power output and a pitch angle to identify a suitable operational region.

Figure 11:
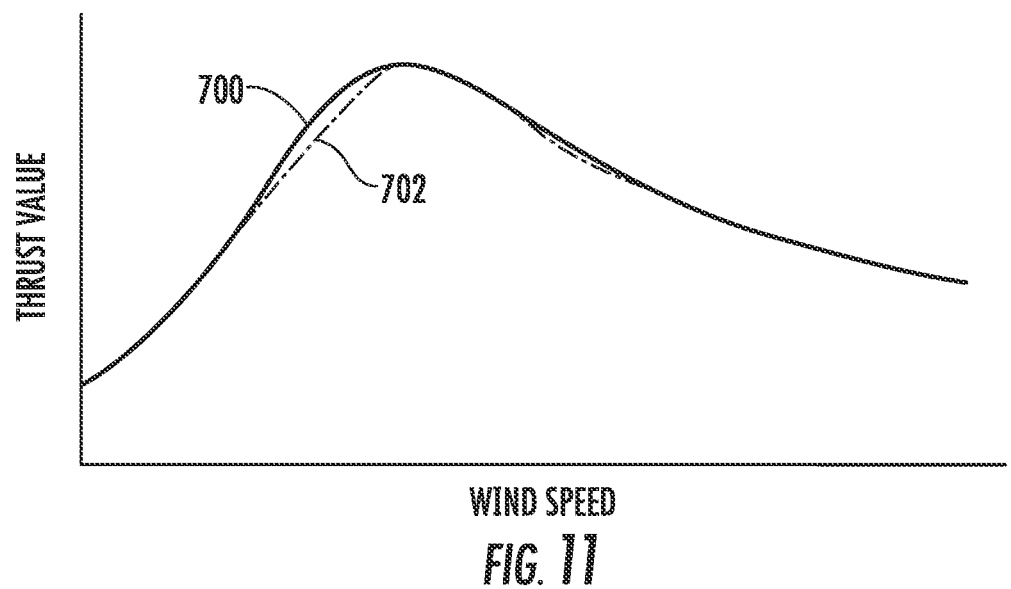
FIG. 11 illustrates a graph comparing a thrust value corresponding to a constant thrust limit and a thrust value corresponding to a variable thrust limit according to the present disclosure; and, FIG. 12 illustrates a flow diagram of one embodiment of a method for preventing excessive loading acting on a wind turbine according to the present disclosure.

In such an embodiment, the controller 26 may estimate a current wind parameter, such as a wind speed, using the wind turbine parameter estimator 56. The controller 26 may then set a corresponding thrust limit 602 based on the wind speed. As the wind speed changes, the controller 26 continuously updates the thrust limit 602 as indicated in FIG. 10. Accordingly, as shown in FIG. 11, the controller 26 may control the wind turbine 10 based on a difference between the corresponding thrust value 702 and the thrust limit 602 to prevent excessive loading on the wind turbine 10.

In still further embodiments, the parameter setpoint may be eliminated altogether. In such an embodiment, the controller 26 may control the wind turbine 10 when the maximum wind turbine parameter is greater than a predetermined threshold.

Referring back to FIG. 8, the controller 26 may control the wind turbine 10 by implementing any suitable control action when necessary to prevent or mitigate loads on the wind turbine. It should be understood that the control action as described herein may encompass any suitable command or constraint by the controller 26. For example, in several embodiments, the control action may include temporarily de-rating or up-rating the wind turbine to prevent excessive loads on one or more of the wind turbine components. Up-rating the wind turbine, such as by up-rating torque, may temporarily slow down the wind turbine and act as a brake to help reduce or prevent loading. De-rating the wind turbine may include speed de-rating, torque de-rating or a combination of both. Further, the wind turbine 10 may be de-rated by pitching one or more of the rotor blades 22 about its pitch axis 28. More specifically, the controller 26 may generally control each pitch adjustment mechanism 32 in order to alter the pitch angle of each rotor blade 22 between 0 degrees (i.e., a power position of the rotor blade 22) and 90 degrees (i.e., a feathered position of the rotor blade 22). As such, in one embodiment, the controller 26 may command a new pitch setpoint (e.g. from 0 degrees to 5 degrees), whereas in another embodiment, the controller 26 may specify a new pitch constraint (e.g. a constraint to ensure that subsequent pitch commands are at least 5 degrees).

In still another embodiment, the wind turbine 10 may be temporarily de-rated by modifying the torque demand on the generator 24. In general, the torque demand may be modified using any suitable method, process, structure and/or means known in the art. For instance, in one embodiment, the torque demand on the generator 24 may be controlled using the controller 26 by transmitting a suitable control signal/command to the generator 24 in order to modulate the magnetic flux produced within the generator 24.

The wind turbine 10 may also be temporarily de-rated by yawing the nacelle 22 to change the angle of the nacelle 16 relative to the direction of the wind. In further embodiments, the controller 26 may be configured to actuate one or more mechanical brake(s) in order to reduce the rotational speed of the rotor blades 22, thereby reducing component loading. In still further embodiments, the controller 26 may be configured to perform any appropriate control action known in the art. Further, the controller 26 may implement a combination of two or more control actions.

Figure 12:
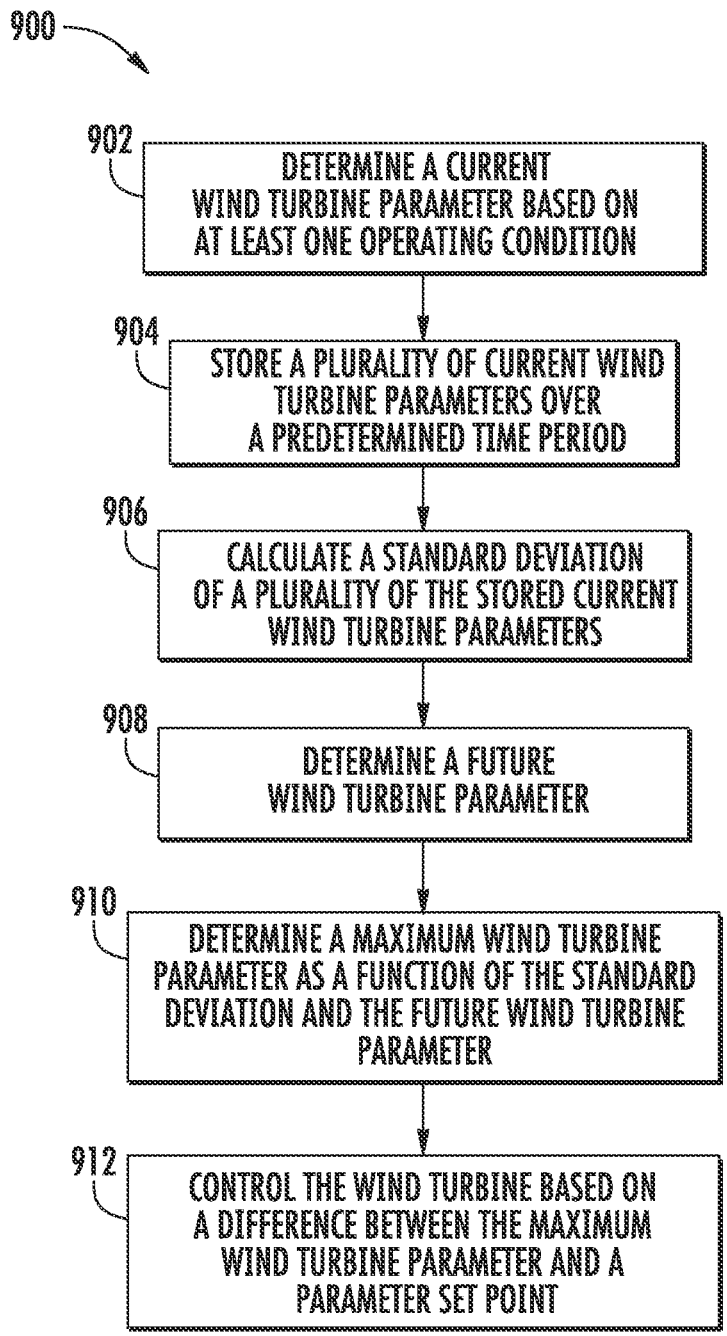

Referring now to FIG. 12, a flow diagram of method 900 according to one embodiment of the present disclosure is illustrated. As shown, the method 900 includes a first step 902 of determining a current wind turbine parameter based on at least one operating condition. A next step 904 includes storing a plurality of current wind turbine parameters over a predetermined time period. The method 900 may then include a step 906 of calculating a standard deviation of a plurality of the stored current wind turbine parameters. Next, step 908 determines a future wind turbine parameter. The method 900 then determines a maximum wind turbine parameter as a function of the standard deviation and the future wind turbine parameter (step 910). The method 900 may then control the wind turbine based on a difference between the maximum wind turbine parameter and a parameter setpoint (step 912) to prevent excessive loading from damaging the wind turbine.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for preventing excessive loading on a wind turbine, the method comprising:
    determining a current wind turbine parameter indicative of a wind turbine thrust using at least one operating condition via a processor, the operating condition indicative of wind turbine operation;
    storing the current wind turbine parameter in a memory store over a predetermined time period;
    calculating a standard deviation of a plurality of the stored current wind turbine parameters via the processor;
    determining a future wind turbine parameter we of the wind turbine thrust via the processor;
    calculating, via the processor, a maximum wind turbine parameter representing a steady-state load from turbine operation and dynamically fluctuating loads due to environmental conditions comprising a function of the standard deviation of the plurality of stored wind turbine parameters added to the future wind turbine parameter;
    controlling the wind turbine, via a controller, based on a difference between the maximum wind turbine parameter and a parameter setpoint to prevent excessive loading on the wind turbine.

2. The method of claim 1, wherein the at least one operating condition indicative of wind turbine operation comprises any of the following: a pitch angle, a generator speed, a power output, a torque output, a temperature, a pressure, a tip speed ratio, an air density, and a rotor speed.

3. The method of claim 2, further comprising varying the parameter setpoint based on at least one of a wind parameter or one of the operation conditions.

4. The method of claim 1, wherein determining the current wind turbine parameter and determining the future wind turbine parameter further comprises utilizing at least one of the following: a plurality of equations, one or more aerodynamic performance maps, or one or more look-up tables.

5. The method of claim 1, further comprising determining a plurality of current wind turbine parameters and filtering the plurality of current wind turbine parameters.

6. The method of claim 5, wherein filtering the plurality of current wind turbine parameters further comprises utilizing one of a high pass filter or a low pass filter.

7. The method of claim 1, further comprising applying one of a constant or variable gain to the standard deviation.

8. The method of claim 1, further comprising multiplying the standard deviation by a scaler factor.

9. The method of claim 1, wherein controlling the wind turbine comprises implementing a control action, the control action comprising at least one of the following: altering a pitch angle of a rotor blade, modifying a generator torque, modifying a generator speed, modifying a power output, yawing a nacelle of the wind turbine, braking one or more wind turbine components, or activating an airflow modifying element on a rotor blade.

10. A method for preventing excessive loading on a wind turbine, the method comprising:
estimating, via a processor, a current wind parameter representative of a wind speed using at least one operating condition, the operating condition indicative of wind turbine operation;
calculating a standard deviation of a plurality of a stored current wind turbine parameters via the processor;
determining, via the processor, a loading condition representing a steady-state load from turbine operation and dynamically fluctuating loads due to environmental conditions the loading condition based on the sum of a standard deviation of the current wind parameter;
determining a parameter setpoint, via the processor, based on the current wind parameter, the parameter setpoint reflective of a loading of the wind turbine before excessive loading occurs;
varying the parameter setpoint with the current wind turbine parameter; and
controlling the wind turbine, via a controller, based on a difference between the loading condition and the parameter setpoint to prevent excessive loading on the wind turbine.

11. The method of claim 10, wherein the at least one operating condition indicative of wind turbine operation comprise any combination of the following: a pitch angle, a generator speed, a power output, a torque output, a temperature, a pressure, a tip speed ratio, an air density, and a rotor speed.

12. The method of claim 10, wherein determining the current wind parameter and determining the loading condition further comprises utilizing one or more of the following: a plurality of equations, one or more aerodynamic performance maps, or one or more look-up tables.

13. A method for preventing excessive loading on a wind turbine, the method comprising:
determining a current thrust parameter, via a processor, based on a plurality of operating conditions, the operating conditions indicative of wind turbine operation;
storing the current thrust parameter in a memory store over a predetermined time period;
calculating a standard deviation, via the processor, of a plurality of the stored current thrust parameters;
applying one of a constant gain or variable gain to the standard deviation;
determining a future thrust parameter via the processor;
calculating, via the processor, a maximum thrust parameter representing a steady-state load from turbine operation and dynamically fluctuating loads due to environmental conditions as a function of the sum of the standard deviation and the future wind turbine parameter; and,
implementing a control action, via a controller, based on a difference between the maximum thrust parameter and a parameter setpoint to prevent excessive loading on the wind turbine.

14. The method of claim 13, further comprising determining a plurality of current thrust parameters and filtering the plurality of current thrust parameters, wherein filtering the plurality of current thrust parameters further comprises utilizing one of a high pass filter or a low pass filter.

15. The method of claim 13, further comprising varying the parameter setpoint based on at least one of a wind parameter or one of the operation conditions.

* * * * *